United States Patent Office 3,128,192
Patented Apr. 7, 1964

3,128,192
PROCESS FOR PRODUCING A DRY
CHEESE PRODUCT
Demetrius G. Vakaleris, Niles, Ill., assignor to National
Dairy Products Corporation, New York, N.Y., a corporation of Delaware
No Drawing. Filed Sept. 11, 1961, Ser. No. 137,006
4 Claims. (Cl. 99—116)

The present invention relates to the manufacture of an improved cheese product, and, more particularly, it relates to bakers'-type cheese.

Bakers' cheese is a cheese prepared from skim milk, and resembles cottage cheese in this respect. Bakers' cheese is used in making such bakery products as cheese cake, pie, and pastries.

The conventional procedure for the manufacture of bakers' cheese comprises inoculating skim milk with a starter and adding rennet, and allowing coagulation of the bilk to form a curd. After curd formation the curd is placed into bags, and whey is allowed to drain from the bags. The bags may be cooled to retard further development of acidity. The drained curd is then packed in cans or tubs for storage. The resultant bakers' cheese must be maintained at fairly low temperature to retard spoilage thereof.

One disadvantage of the foregoing bakers' cheese product is its susceptibility to spoilage. This problem has meant that shipment of bakers' cheese for extended distances is impractical, and accordingly, manufacturing facilities for bakers' cheese are usually located only in areas of substantial consumption. In addition, bakers utilizing such cheese must either maintain refrigerated storage facilities, or must order quantities which may be utilized in a single day's production.

In an effort to avoid the foregoing problems, various dry products have heretofore been prepared which, when reconstituted, have been intended as substitutes for bakers' cheese. The moisture content of such dry products is desirably low enough to prevent the continued growth of microorganisms and flavor deterioration, thereby enabling storage at ambient temperatures without refrigeration.

It is an object of the present invention to provide an improved dry product, which, when reconstituted with moisture, will provide a product utilizable as bakers' cheese. It is a further object of the present invention to provide a dry product reconstitutable as bakers'-type cheese which has improved water absorbing properties. Other objects and advantages of the present invention will become apparent from the following description and claims.

Generally, in accordance with the present invention, there is provided a dry product reconstitutable as bakers'-type cheese, comprising a major proportion of milk protein, and relatively minor proportions of lactose and moisture. The milk protein includes at least about 10 percent heat-denatured serum protein, based on the weight of the milk protein, As used throughout this specification, the term "milk protein" referes to the totality of proteins normally present in milk, and the term "serum protein" refers to milk proteins other than casein. The dry product of the present invention is stable at room temperatures for extended periods of time, and is readily reconstituted with water to provide a product having desirable bakers' cheese flavor and smoothness. Upon reconstitution, there is provided substantially improved capacity for absorption of water. The product of the present invention is well adapted for inclusion in products where bakers' cheese flavor is desirable, and is particularly well suited for the preparation of cheese cake, and other baked goods.

As above indicated, the milk protein in the product of the present invention includes at least about 10 percent heat-denatured serum protein. This is an important feature of the present invention, and is responsible in part for improved water absorbing characteristics. Upon reconstitution with as much as four times its weight of water, the product of the present invention provides a cheese having texture and body which are well suited for baking applications.

The product of the present invention may be prepared by at least two procedures. In general acocrdance with the first procedure, skim milk is subjected to high-temperature, short-time heat treatment, whereby denaturation of serum protein is effected. In this connection, denaturation of serum protein is effected under conditions whereat at least about two-thirds of the heat-denaturable serum protein is denatured. Denaturation is carried out at temperatures substantially higher than normal pasteurization temperatures. The extent of denaturation at a particular temperature is functionally related to the duration of treatment. In order to minimize undesirable flavor formation, denaturation may be effected at temperatures above 200° F. for rleatively short periods of time. Preferably, in order to obtain maximum yields of denatured serum protein, the skim milk is subjected to a temperature of about 220° F. for about 30 seconds. This treatment or equivalent treatments effects denaturation of substantially all of the heat-denaturable serum protein. Equivalent treatment times at other temperatures may readily be determined by those skilled in the art.

The heat treated milk is inoculated with starter and rennet, in accordance with conventional methods. The milk is allowed to coagulate to form a curd which is cut, and the curd is thereafter cooked to expel whey. The whey is drained off, the curd is washed with water, and the curd is thereafter suspended in water to provide a slurry.

The slurry is homogenized to provide a homogeneous mixture, and is thereafter spray dried to provide the dry product of the present invention. The product comprises about 80 percent milk protein, less than about 10 percent lactose, and, for desirable keeping quality, preferably comprises less than about 5 percent moisture. When prepared in accordance with the preferred procedure, herein set forth, the milk protein of the product comprises about 15 percent heat-denatured serum protein.

In general accordance with the second procedure, a cheese curd is prepared from skim milk by a conventional cottage cheese make porcedure, and is thereafter suspended in water to provide a slurry. The slurry is homogenized and spray dried to provide a dry powder.

Further in accordance with the second procedure, denatured serum protein is prepared from whey. In this connection, whey is subjected to heat treatment to effect denaturation of the serum protein. In this connection, subjecting the whey to the conditions of time-temperature set forth in connection with the first procedure may be utilized to effect denaturation of the serum protein. The denatured serum protein is separated from the remainder of the whey, washed with water, and suspended in water to provide a slurry. The slurry is dried to provide a dry powder comprising denatured serum protein.

Still further in accordance with the second procedure, the dried powders are blended at proportions whereby the protein in the resultant dry product of the invention includes at least about 10 percent denatured serum protein, and preferably includes about 15 percent of denatured serum protein. The product readily reconstitutes in water to provide a smooth, firm paste having a desirable bakers' cheese flavor.

In this connection, if the dried powders are blended in proportions whereby the protein comprises substantially less than 10 percent denatured serum protein, the resultant dry product may have insufficient capacity to absorb water, and baking performance is not as satisfactory. If the protein comprises substantially more than about 20 percent of denatured serum protein, the reconstituted product acquires a somewhat grainy texture, but this coarse texture may be avoided by suitable adjustment of the mineral balance in accordance with the art.

*Example I*

As an example of the practice of the present invention, 3,000 pounds of skim milk was heat-treated by passing the skim milk through a Votator unit. The surface of the Votator cylinder was maintained at about 220° F. and the retention time of the skim milk in the cylinder was about 30 seconds. This high-temperature, short-time heat treatment effected denaturation of about 75 percent of the nitrogenous materials in the serum, which was substantially all the heat-denaturable serum protein.

The heat-treated skim milk was introduced into a conventional cottage cheese vat, and was set with starter and rennet. The acidity was allowed to develop until the pH of the curd was about 4.9, providing a whey acidity of about 0.39 percent. At this acidity the curd was cut, and the curd was then cooked to 130° F. Whey was drained from the curd, and the curd was washed three times with water. There was obtained 0.384 pound of cheese solids per pound of skim milk solids.

Water was added to the curd, and the mixture was milled to provide a slurry comprising about 12 percent solids. The slurry had a pH of 4.9. The slurry was homogenized at 2000 p.s.i. and spray-dried to provide the product of the present invention. The dried product comprised about 80 percent milk protein, about 8 percent lactose, and about 4.1 percent moisture. The milk protein of the product included about 15 percent denatured serum protein.

The product was stable for about 4 months when held at room temperature, and was stable for more than a year at refrigerator temperatures. Upon reconstitution with water a smooth firm cheese was obtained which had a desirable bakers' cheese flavor. In this connection, the paste had a relatively firm body upon the addition of up to four parts of water per part of the dry bakers'-type cheese.

The product of this example was utilized in preparing a cheese cake, and the cake had a desirably smooth texture, high volume and rigid structure. In comparison, a control cheese cake was prepared from a commercially-available dry bakers'-type cheese product, which product included vegetable gum for water absorption purposes. The cheese cake made from the product of this example had substantially higher volume, firmer structure, and better flavor than the control cheese cake.

*Example II*

As an additional example of the practice of the present invention, curd was prepared in accordance with Example I and was milled with water in the same manner as in Example I. The pH of the resultant slurry was adjusted from 4.9 to 4.2 by the addition of phosphoric acid. The slurry was homogenized at about 2,000 p.s.i. at a pH of 4.2, and the viscosity of the homogenized slurry was about 25 percent less than the viscosity of the homogenized slurry of Example I. The pH of the homogenized slurry was then adjusted to 4.6 by the addition of sodium hydroxide, causing a viscosity increase of about 3 percent. The homogenized slurry was thereafter spray-dried to provide the dry product of the present invention. Pumpability and handling properties of the homogenized slurry were substantially improved in comparison with the homogenized slurry of Example I.

The water absorption capacity of the product was substantially the same as that of the product of Example I, and cheese cake baked from the product was equivalent to the cheese cake made from the product of Example I.

*Example III*

As an additional example of the practice of the present invention, cheese curd was prepared from skim milk in accordance with conventional procedures. In this connection, 3,000 pounds of skim milk was pasteurized by holding the milk at 161° F. for 16 seconds. This heat treatment was insufficient to effect denaturation of serum protein.

The pasteurized milk was introduced into a conventional cheese vat, and the milk was set with starter and rennet. The curd was cut at a pH of 4.6, providing a whey acidity of 0.52 percent. The curd was cooked to 120° F., and the whey drained from the curd. The curd was washed with water, and there was obtained 0.340 pound of cheese solids per pound of skim milk solids. The curd was thereafter milled with water to provide a slurry comprising about 12 percent solids. The slurry, which had a pH of about 4.6, was homogenized at about 2,000 p.s.i., and the homogenized slurry was spray-dried to provide a cheese powder.

Heat-denatured serum protein was prepared from whey. In this connection, the serum protein in the whey was precipitated by holding the whey at about 200° F. for about 10 minutes. The resultant precipitate of serum protein was filtered from the treated whey, and the precipitate was washed with water to remove residual lactose and mineral compounds.

The denatured serum protein was freeze-dried, and the dried material was ground to provide a powder comprising denatured serum protein.

One part of the powder comprising dried denatured serum protein was blended with 5.7 parts of the spray-dried cheese powder prepared as previously indicated.

The resultant dry product comprised about 81 percent milk protein, about 8 percent lactose, and about 5 percent moisture. The protein of the dry product included about 15 percent denatured serum protein. The dry product reconstituted readily upon the addition of water to provide a smooth, firm paste substantially equivalent to the paste of Example I, and its water absorption characteristics and cheese cake baking performance were also substantially the same.

For purposes of comparison, another product was prepared by blending 5.7 parts of the spray-dried cheese powder of this example with one part of dried undenatured serum protein which had been prepared by absorption of serum protein on carboxymethylcellulose. The resultant dry product, in which about 15 percent of the milk protein comprised undenatured serum protein, had substantially less capacity for water absorption than the product of the present invention. In this connection, the addition of four parts of water to one part of the dry product resulted in a fluid mixture.

Thus, there has been provided an improved dry product which, when reconstituted with water, provides a product utilizable as bakers' cheese. The reconstituted material has substantially improved capacity for absorption of water, and has a desirable bakers' cheese flavor.

While the product of the present invention is particularly suited for general use as a bakers'-type cheese, it will be apparent that it may also be utilized in various other ways. For example, the product of the present invention may be utilized in various dressing and dip formulations.

Various of the features of the present invention are set forth in the following claims.

What is claimed is:

1. In a process for preparing a dry product reconstitutable as a bakers'-type cheese, the improvement which comprises including in the product between about 10 percent and about 20 percent of heat-denatured serum protein, based on the milk protein in the product.

2. A process for producing a dry product reconstitutable as a bakers'-type cheese, which process comprises the steps of heat treating skim milk at an elevated temperature above the pasteurization temperature of the milk for a length of time sufficient to effect at least about two-thirds denaturation of the serum protein therein, coagulating said milk to form a curd, cutting the curd, forming a slurry from said curd and drying said slurry to provide a product which includes between about 10 percent to about 20 percent by weight of the milk protein in the product of heat denatured serum protein, whereby a dry reconstitutable bakers'-type cheese product having improved water absorbing properties is obtained.

3. A process for producing a dry product reconstitutable as a bakers'-type cheese, which process comprises forming a mixture of dry cottage cheese powder and an amount of dry powdered denatured serum protein so that between about 10 percent and about 20 percent of the milk protein of said mixture is heat denatured serum protein.

4. A process for producing a dry product reconstitutable as a bakers'-type cheese, which process comprises the steps of heat treating skim milk at an elevated temperature above the pasteurization temperature of the milk for a length of time sufficient to effect at least about two-thirds denaturation of the serum protein in said milk, coagulating said heat treated milk, cutting the resulting curd at a pH of about 4.9, cooking said curd to expel whey and washing said curd, mixing said curd with water to form a slurry at a pH of about 4.9, adjusting the pH of said slurry from about 4.9 to about 4.2, homogenizing said slurry at a pH of about 4.2 to lower the viscosity thereof, raising the pH of said slurry to about 4.6, and spray drying said slurry at a pH of about 4.6 to provide a reconstitutable bakers'-type cheese product having improved water absorbing properties.

References Cited in the file of this patent

UNITED STATES PATENTS

| | | |
|---|---|---|
| 1,737,770 | Parsons | Dec. 3, 1929 |
| 2,682,469 | Stuart et al. | June 29, 1954 |
| 2,956,885 | Roundy et al. | Oct. 18, 1960 |